(12) United States Patent
Cotter

(10) Patent No.: US 10,011,317 B2
(45) Date of Patent: Jul. 3, 2018

(54) STEERING MECHANISM FOR PEDAL DRIVEN VEHICLE

(71) Applicant: Robert M Cotter, Raleigh, NC (US)

(72) Inventor: Robert M Cotter, Raleigh, NC (US)

( * ) Notice: Subject to any disclaimer, the term of this patent is extended or adjusted under 35 U.S.C. 154(b) by 0 days.

(21) Appl. No.: 14/775,912

(22) PCT Filed: Mar. 12, 2014

(86) PCT No.: PCT/US2014/024300
§ 371 (c)(1),
(2) Date: Sep. 14, 2015

(87) PCT Pub. No.: WO2014/165074
PCT Pub. Date: Oct. 9, 2014

(65) Prior Publication Data
US 2016/0031518 A1 Feb. 4, 2016

Related U.S. Application Data

(60) Provisional application No. 61/779,701, filed on Mar. 13, 2013.

(51) Int. Cl.
*B62K 21/02* (2006.01)
*B62K 5/08* (2006.01)

(52) U.S. Cl.
CPC ............... *B62K 21/02* (2013.01); *B62K 5/08* (2013.01)

(58) Field of Classification Search
CPC . B62K 3/005; B62K 5/08; B62K 9/02; B62K 21/00; B62K 23/02; B62K 21/02
See application file for complete search history.

(56) References Cited

U.S. PATENT DOCUMENTS

| 1,599,223 A | 2/1926 | Epps |
| 1,777,781 A | 5/1929 | Biagi |
| 3,561,778 A * | 2/1971 | La Brie .................... B62K 5/10 |
| | | 280/12.14 |

(Continued)

FOREIGN PATENT DOCUMENTS

| CN | 201151444 Y | 11/2008 |
| GB | 191011300 A | 4/1911 |
| WO | 2010095922 A2 | 8/2010 |

OTHER PUBLICATIONS

International Search Report and Written Opinion dated Oct. 24, 2014 for PCT/US14/24300.

(Continued)

*Primary Examiner* — Tony H Winner
*Assistant Examiner* — Michael R Stabley
(74) *Attorney, Agent, or Firm* — Manatt, Phelps & Phillips, LLP

(57) ABSTRACT

The present invention relates to a steering assembly for a vehicle, comprising two rotatable rods, oriented vertically and having a wheel attachment on one end wherein wheels can be rotatably secured. The rods are connected to a first cross bar in such a way that enables the steering assembly to be attached to the vehicle frame and allows the rods to rotate. The rods are also rotatably attached to a second cross bar on the opposite end of the rod in such a way as to allow the rods to rotate. The rods are also attached to a steering mechanism in a manner that enables them to be manually rotated in unison and which in turn pivots the wheels and steers the vehicle.

24 Claims, 5 Drawing Sheets

(56) References Cited

U.S. PATENT DOCUMENTS

| | | | | |
|---|---|---|---|---|
| 4,070,032 A * | 1/1978 | Cunningham | ............ | B62K 5/00 |
| | | | | 280/202 |
| 4,072,325 A | 2/1978 | Bright et al. | | |
| 4,351,410 A | 9/1982 | Townsend | | |
| 4,717,164 A * | 1/1988 | Levavi | .................... | B60G 17/00 |
| | | | | 180/210 |
| 4,740,004 A | 4/1988 | McMullen | | |
| 6,161,860 A | 12/2000 | Corneau | | |
| 6,367,824 B1 * | 4/2002 | Hayashi | .................... | B62K 5/05 |
| | | | | 280/124.103 |
| 6,817,617 B2 * | 11/2004 | Hayashi | .................... | B62K 5/05 |
| | | | | 280/124.1 |
| 6,953,203 B2 | 10/2005 | Wilcox et al. | | |
| 7,708,291 B1 * | 5/2010 | Henderson | ................ | B62D 9/02 |
| | | | | 280/124.103 |
| 7,731,210 B2 * | 6/2010 | Pedersen | .............. | B60G 21/007 |
| | | | | 180/209 |
| 8,016,302 B1 * | 9/2011 | Reeve | ....................... | B62K 5/05 |
| | | | | 280/124.103 |
| 8,419,027 B2 * | 4/2013 | Ting | .......................... | B62K 5/02 |
| | | | | 280/124.103 |
| 2012/0280467 A1 * | 11/2012 | Walther | ................. | B62K 5/023 |
| | | | | 280/263 |
| 2013/0214520 A1 * | 8/2013 | Bonanno | ................... | B62K 5/08 |
| | | | | 280/771 |
| 2014/0070513 A1 * | 3/2014 | Teerlink | ................... | B62K 3/12 |
| | | | | 280/209 |

OTHER PUBLICATIONS

Supplemental European Search Report from EP14779623, dated Sep. 19, 2016, 1pg.

* cited by examiner

STEERING MECHANISM FOR PEDAL DRIVEN VEHICLE

CROSS-REFERENCE TO RELATED APPLICATION

This application is a National Stage Entry of PCT Application No. PCT/US14/24300 filed Mar. 12, 2014, which claims priority to U.S. Provisional Application No. 61/779,701 filed Mar. 13, 2013. All of the above applications are hereby incorporated herein by reference in their entirety and are to be considered a part of this specification.

BACKGROUND OF INVENTION

The world today is experiencing some significant changes to the climate, some of it is believed to be caused by to the emission of carbon dioxide by burning fossil fuels. The burning of carbon based fuels coverts carbon to carbon dioxide which leads to increased concentrations of carbon dioxide in the atmosphere which is believed to contribute to climate change. Certainly one of the biggest users of fossil fuels are vehicles used for transportation of people and things. Most of these vehicles are propelled by internal combustion engines which burn fossil fuels. Therefore, any practical reduction in the number of these type of vehicles would possibly mitigate future climate damage.

One of the ways to reduce the use of such vehicles is to increase the use of self-propelled non-carbon dioxide emitting vehicles such as bicycles. However, bicycles have their limitations. Bicycles sometimes can be difficult the roads with to see when sharing cars and trucks. With the exception of recumbent bicycles, most bicycle seats are not comfortable. In addition, with most bicycles you are exposed to the elements.

A need exists for a non-pollution emitting vehicle that can be both self-propelled and/or propelled by a non-polluting motor.

SUMMARY OF INVENTION

The present invention relates generally to a steering assembly for a vehicle, comprising two rods, rotatable and oriented essentially vertically and having a wheel attachment means on one end wherein wheels can be rotatably secured. The rods are connected to a first cross bar in such a way that enables the steering assembly to be attached to the vehicle frame and allows the rods to rotate. The rods are also rotatably attached to a second cross bar on the opposite end of the rod in such a way as to allow the rods to rotate. The rods are also attached to a steering means in a manner that enables them to be manually rotated in unison and which in turn pivots the wheels and steers the vehicle.

BRIEF DESCRIPTION OF THE DRAWINGS

Implementation of the invention will become more apparent from the detailed description set forth below when taken in conjunction with the drawings, in which like elements bear like reference numbers.

DETAILED DESCRIPTION OF THE INVENTION

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

The steering assembly can be attached to any type of self-propelled or motor propelled vehicle. Such self-propelled vehicle could be a pedal type bicycle such as a recumbent type tricycle.

The rods (100A & B) of the present invention have a distal and proximal ends and are preferably cylindrical in shape. The rods should preferably be made of light and strong material such as metal, metal composite or plastic. Other materials of equal weight and strength may be suitable as well as certain grades of aluminum. The rods may also be solid or hollow such as a tube.

The rods have a wheel attachment means (101A & B) on its distal end. The wheel attachments means provides a hub for the rotatable attachment of a wheel. Such attachment means should be made of strong and light material such as metal wherein wheels can be rotatably secured. The wheels can be bicycle wheels like that found on street pedal road bike.

The first cross bar (103) as referred to herein is positioned between the distal and proximal ends of the rods. The cross bar enables the steering assembly to be attached to the vehicle frame and also allows the rods to rotate about the X axis, The second cross bar (105) as referred to herein is connected to the proximal end of the rods in such a way as to allow the rods to rotate about the X axis. In addition, the bar is connected to the steering means (104) in such a manner that enables the manual rotation of the two rods in unison about the X axis, which in turn pivots the wheels and steers the vehicle.

Figure 1:
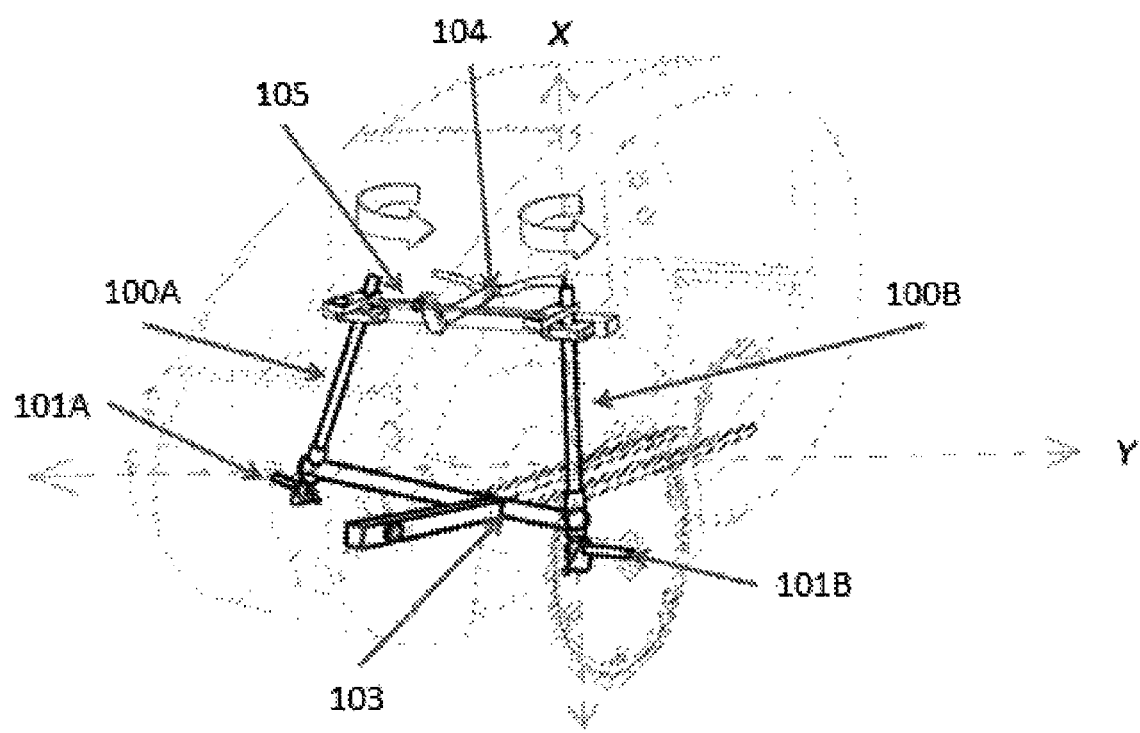
FIG. 1 is a perspective view of the steering assembly of the present invention.
Figure 2:
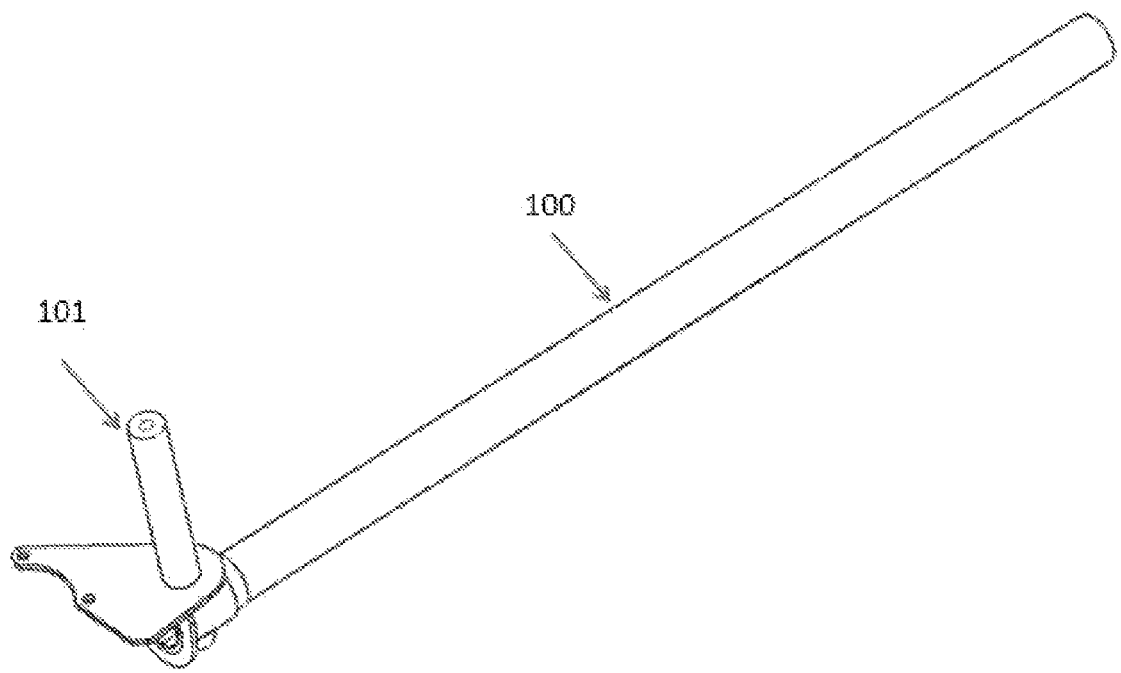
FIG. 2 is a view of the rods and wheel attachment means of the present invention.
Figure 3:
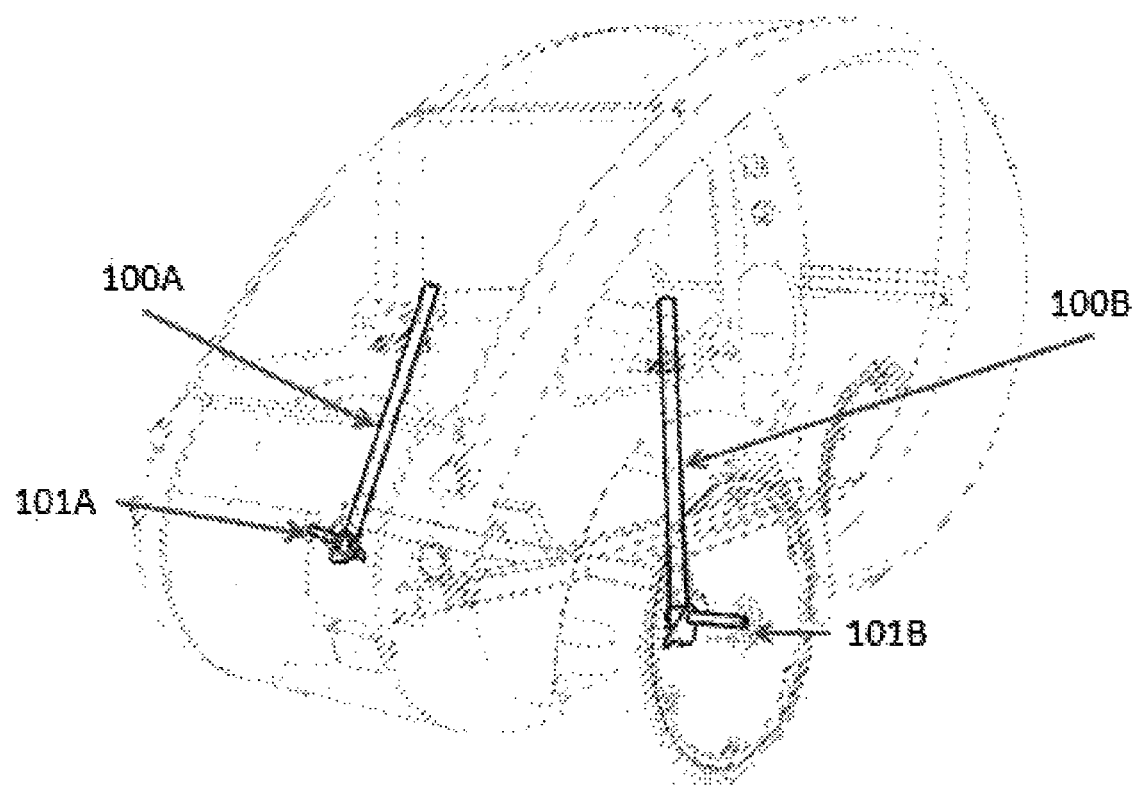
FIG. 3 is a view of the rods and wheel attachment as position within a vehicle.
Figure 4:
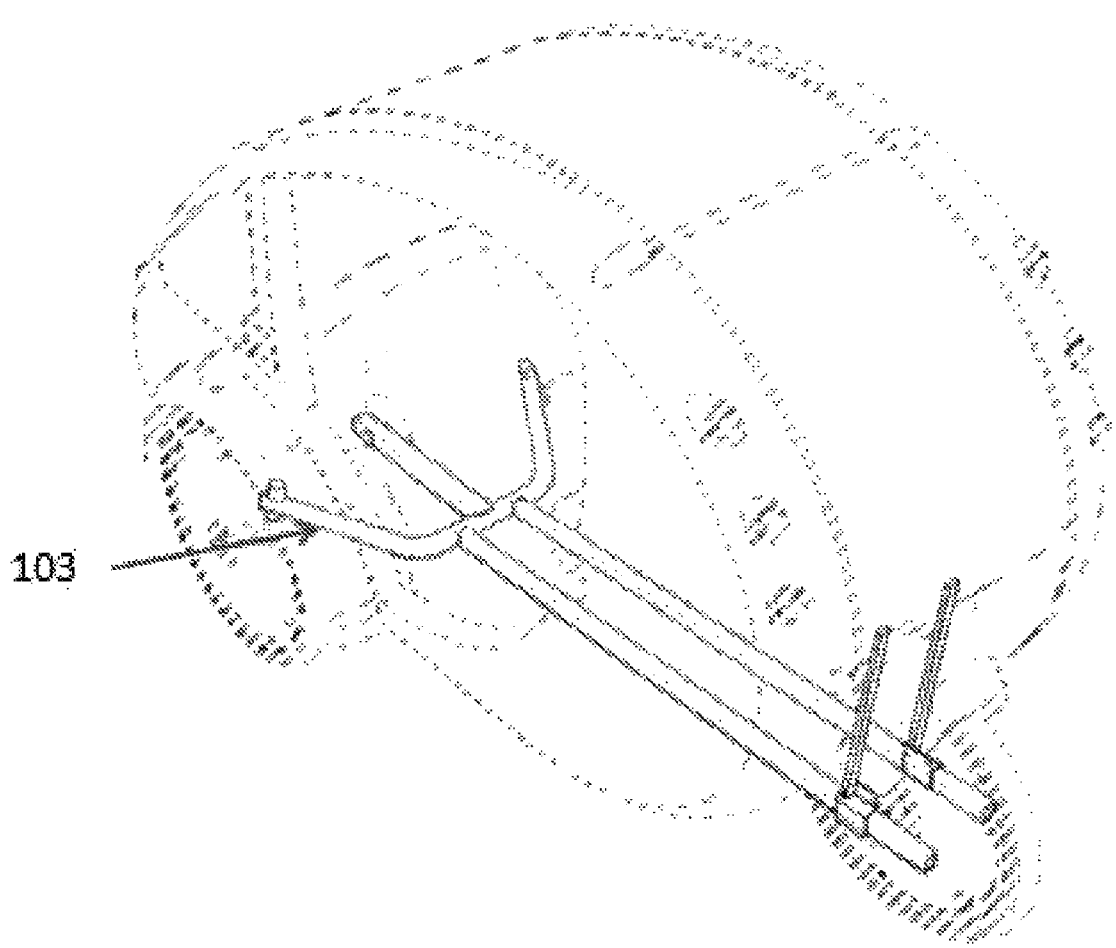
FIG. 4 is a view of a C shaped first cross bar attached to the vehicle frame.
Figure 5:
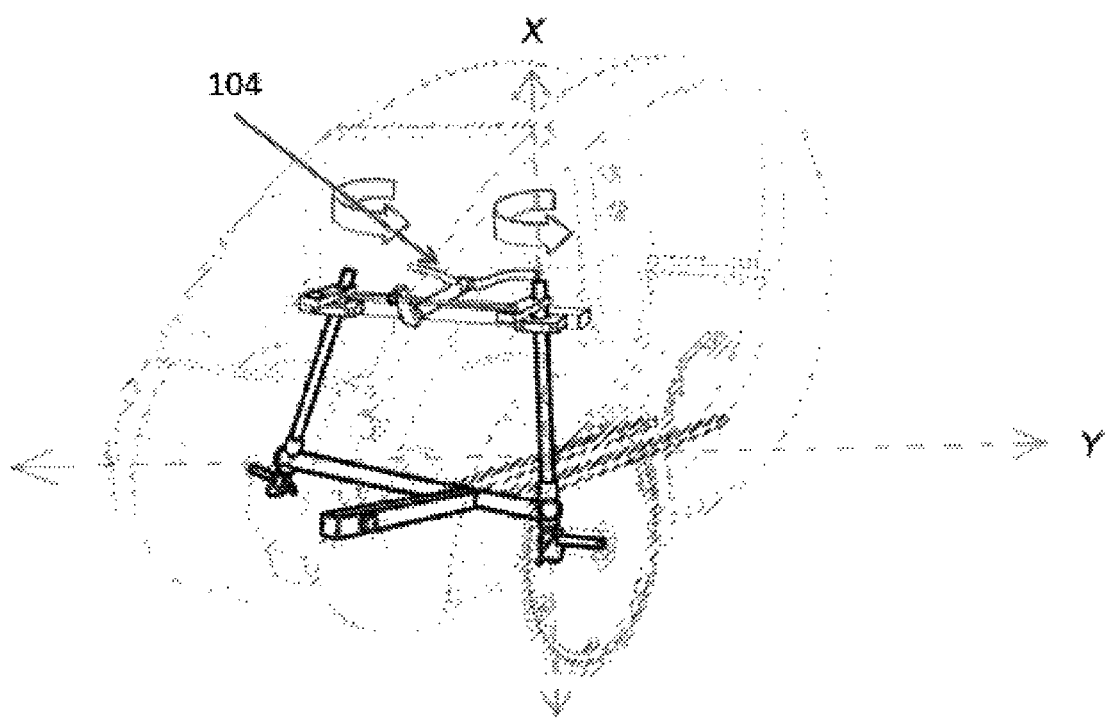
FIG. 5 is a view of one embodiment of the steering assembly means.

As used herein the steering means (104) refers to a steering mechanism which enables the manual rotation of the rods in unison about the X axis, which in turn pivots the wheels and steers the vehicle. Such steering mean can consist of a steering device like a bike handle bars as in shown in FIGS. 1 and 5 connected through a column positioned essentially perpendicular to two bars connected to the rods in such a way that the rods are rotated in unison about their X axes.

What is claimed is:

1. A steering assembly for a vehicle, the steering assembly comprising:
    first and second rods each having distal and proximal ends, each rod oriented essentially vertically and rotatable about a respective X axis, the first and second rods further attached to first and second wheel attachment devices, respectively, on the distal end thereof to which a wheel can be rotatably secured;
    a first cross bar attached to the distal end of each rod, which enables the steering assembly to be attached to a frame of the vehicle and allows each of the rods to rotate about the respective X axis;

a second cross bar attached to the proximal end of each rod in such a way as to allow each of the rods to rotate about the respective X axis; and a steering mechanism attached to and located between the rods in a manner that enables the rods to be manually rotated substantially in unison about the respective X axes which in turn pivots each of the respective wheels and steers the vehicle, wherein the first and second wheel attachment devices are attached and adjacent to the rods on the opposite side of where the first cross bar is attached, wherein at least one of the first and second wheel attachment devices are attached to the first cross bar through the rods at a position that is lower than an upper rim of each of the wheels, and wherein a plane formed by the first cross bar and the frame is substantially perpendicular to the first and second rods.

2. The steering assembly of claim 1, wherein the rods are made of aluminum.

3. The steering assembly of claim 1, wherein the first cross bar has a C shape.

4. The steering assembly of claim 1, wherein the steering assembly includes a protective shell.

5. The steering assembly of claim 1, wherein the first cross bar is essentially horizontal and attached to the rods in a manner in which enables each rod to be rotated about the X axis substantially in unison.

6. A steering assembly, comprising:
a first rod having a first distal end and a first proximal end, the first rod is rotatable about a first axis;
a second rod having a second distal end and a second proximal end, the second rod is rotatable about a second axis;
a first cross bar attached to both the first distal end and the second distal end, the first cross bar further attached to a frame of the vehicle;
a second cross bar attached to both the first proximal end and the second proximal end;
a first wheel attachment coupled to the first distal end of the first rod and a second wheel attachment coupled to the second distal end of the second rod, the first wheel attachment is configured to rotatably secure a first wheel and the second wheel attachment is configured to rotatably secure a second wheel; and
a steering mechanism attached to and located between the rods in a manner that enables the rods to be manually rotated substantially in unison about the respective axes which in turn pivots each of the respective wheels and steers the vehicle, wherein at least one of the first and second wheel attachments are attached to the first cross bar through the rods at a position that is lower than an upper rim of each of the wheels, and wherein a plane formed by the first cross bar and the frame is substantially perpendicular to the first and second rods.

7. The steering assembly of claim 6, wherein when the first rod is rotatable about the first axis, the first wheel is rotatable accordingly, and wherein when the second rod is rotatable about the second axis, the second wheel is rotatable accordingly.

8. The steering assembly of claim 6, wherein the steering assembly includes a protective shell configured to substantially enclose both the steering assembly and the first and second wheels.

9. The steering assembly of claim 6, wherein the first cross bar and the second cross bar are coupled only through the first and second rods.

10. The steering assembly of claim 6, wherein the steering assembly is not foldable.

11. The steering assembly of claim 6, wherein the frame has at least one horizontal support beam having two sections with the steering mechanism located at one of the two sections on the at least one horizontal support beam.

12. The steering assembly of claim 11, further comprising a wheel positioned and attached to the at least one horizontal support beam.

13. The steering assembly of claim 6, wherein the frame has two horizontal support beams, each of the horizontal support beams has two ends with the steering mechanism located at one of the two ends on each of the horizontal support beams.

14. The steering assembly of claim 13, further comprising a wheel positioned and attached between the two support beams.

15. A steering assembly and vehicle frame for a vehicle, comprising:
a first rod having a first distal end and a first proximal end, the first rod is rotatable about a first axis;
a second rod having a second distal end and a second proximal end, the second rod is rotatable about a second axis, the second axis is substantially parallel to the first axis;
a first cross bar attached to both the first distal end and the second distal end;
a second cross bar attached to both the first proximal end and the second proximal end;
a first wheel attachment coupled to the first distal end of the first rod and a second wheel attachment coupled to the second distal end of the second rod, the first wheel attachment is configured to rotatably secure a first wheel and the second wheel attachment is configured to rotatably secure a second wheel;
a frame attached to the first cross bar, the frame comprising two horizontal support beams;
a third wheel positioned and coupled between the two horizontal support beams; and
a steering mechanism attached to and located between the rods in a manner that enables the rods to be manually rotated substantially in unison about the respective axes which in turn pivots each of the respective wheels and steers the vehicle, wherein at least one of the first and second wheel attachments are attached to the first cross bar through the rods at a position that is lower than an upper rim of each of the wheels, and wherein a plane formed by the first cross bar and the frame is substantially perpendicular to the first and second rods.

16. The steering assembly and vehicle frame of claim 15, wherein the steering assembly includes a protective shell configured to substantially enclose both the steering assembly and the first and second wheels.

17. The steering assembly and vehicle frame of claim 15, wherein the vehicle comprises a pedal driven vehicle.

18. The steering assembly and vehicle frame of claim 15, wherein when the first rod is rotatable about the first axis, the first wheel is rotatable accordingly, and wherein when the second rod is rotatable about the second axis, the second wheel is rotatable accordingly.

19. A steering assembly and vehicle frame for a vehicle, comprising:
a first rod having a first distal end and a first proximal end, the first rod is rotatable about a first axis;
a second rod having a second distal end and a second proximal end, the second rod is rotatable about a second axis, the second axis is substantially parallel to the first axis;

a first cross bar attached to both the first distal end and the second distal end;

a second cross bar attached to both the first proximal end and the second proximal end;

a first wheel attachment coupled to the first distal end of the first rod and a second wheel attachment coupled to the second distal end of the second rod, the first wheel attachment is configured to rotatably secure a first wheel and the second wheel attachment is configured to rotatably secure a second wheel;

a frame attached to the first cross bar, the frame comprising at least one horizontal support beam; and a steering mechanism attached to and located between the rods in a manner that enables the rods to be rotated substantially in unison about the respective axes which in turn pivots each of the respective wheels and steers the vehicle, wherein at least one of the first and second wheel attachments are attached to the first cross bar through the rods at a position that is lower than an upper rim of each of the wheels, and wherein a plane formed by the first cross bar and the frame is substantially perpendicular to the first and second rods.

20. The steering assembly and vehicle frame of claim 19, wherein the steering assembly includes a protective shell configured to substantially enclose both the steering assembly and the first and second wheels.

21. The steering assembly and vehicle frame of claim 19, wherein the vehicle comprises a pedal driven vehicle.

22. The steering assembly and vehicle frame of claim 19, wherein when the first rod is rotatable about the first axis, the first wheel is rotatable accordingly, and wherein when the second rod is rotatable about the second axis, the second wheel is rotatable accordingly.

23. The steering assembly and vehicle frame of claim 19, wherein the frame comprises two horizontal support beams, each of the horizontal support beams has two ends with the steering mechanism located at one of the two ends on each of the horizontal support beams.

24. The steering assembly of claim 19, further comprising a third wheel positioned and attached between the two support beams.

* * * * *